B. HOLT.
TRACTION ENGINE.
APPLICATION FILED AUG. 17, 1909.
1,026,090.
Patented May 14, 1912.
4 SHEETS—SHEET 1.
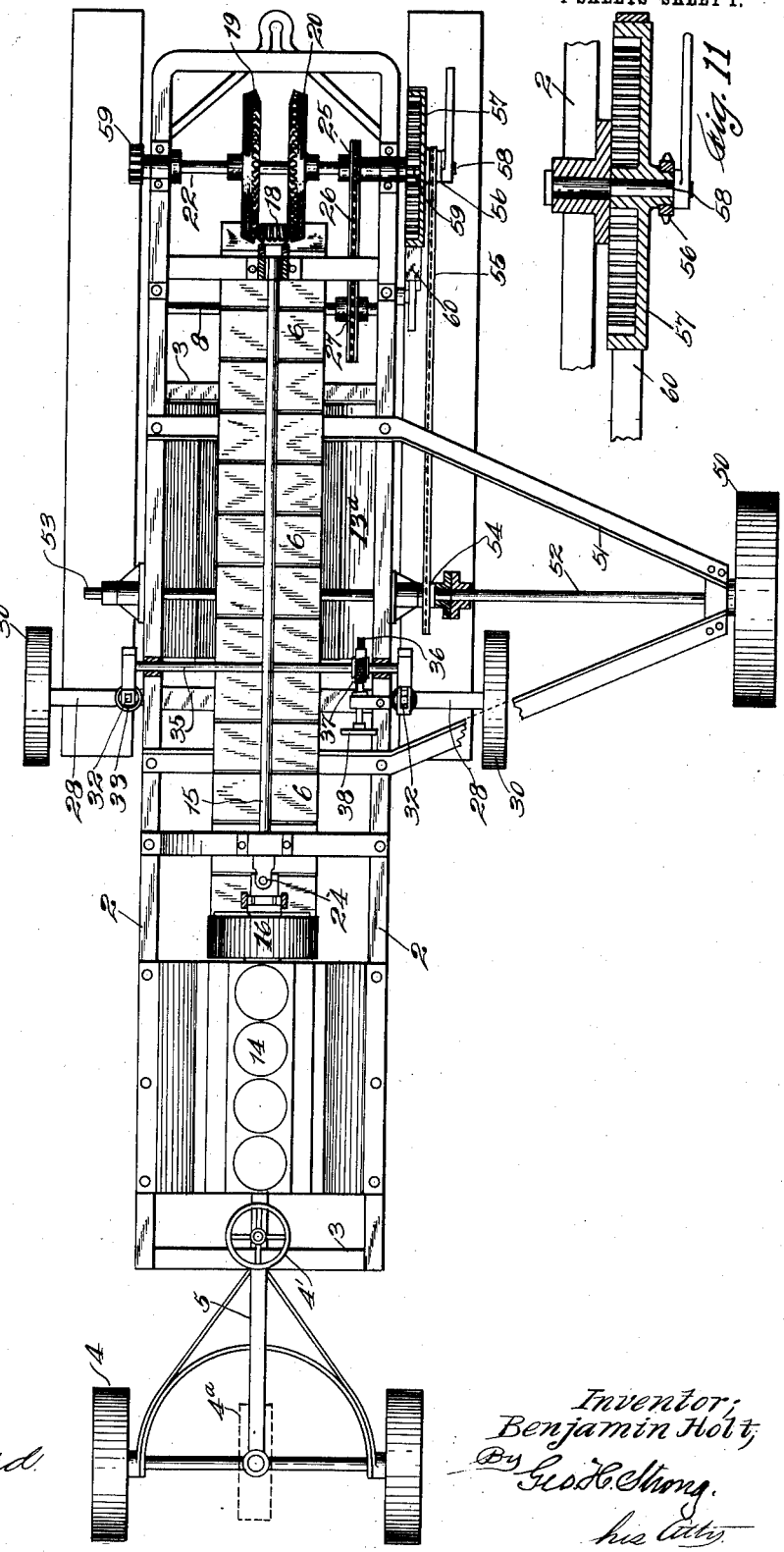
Witnesses:
F. E. Maynard
R. S. Berry
Inventor:
Benjamin Holt,
By Geo. H. Strong.
his Atty.

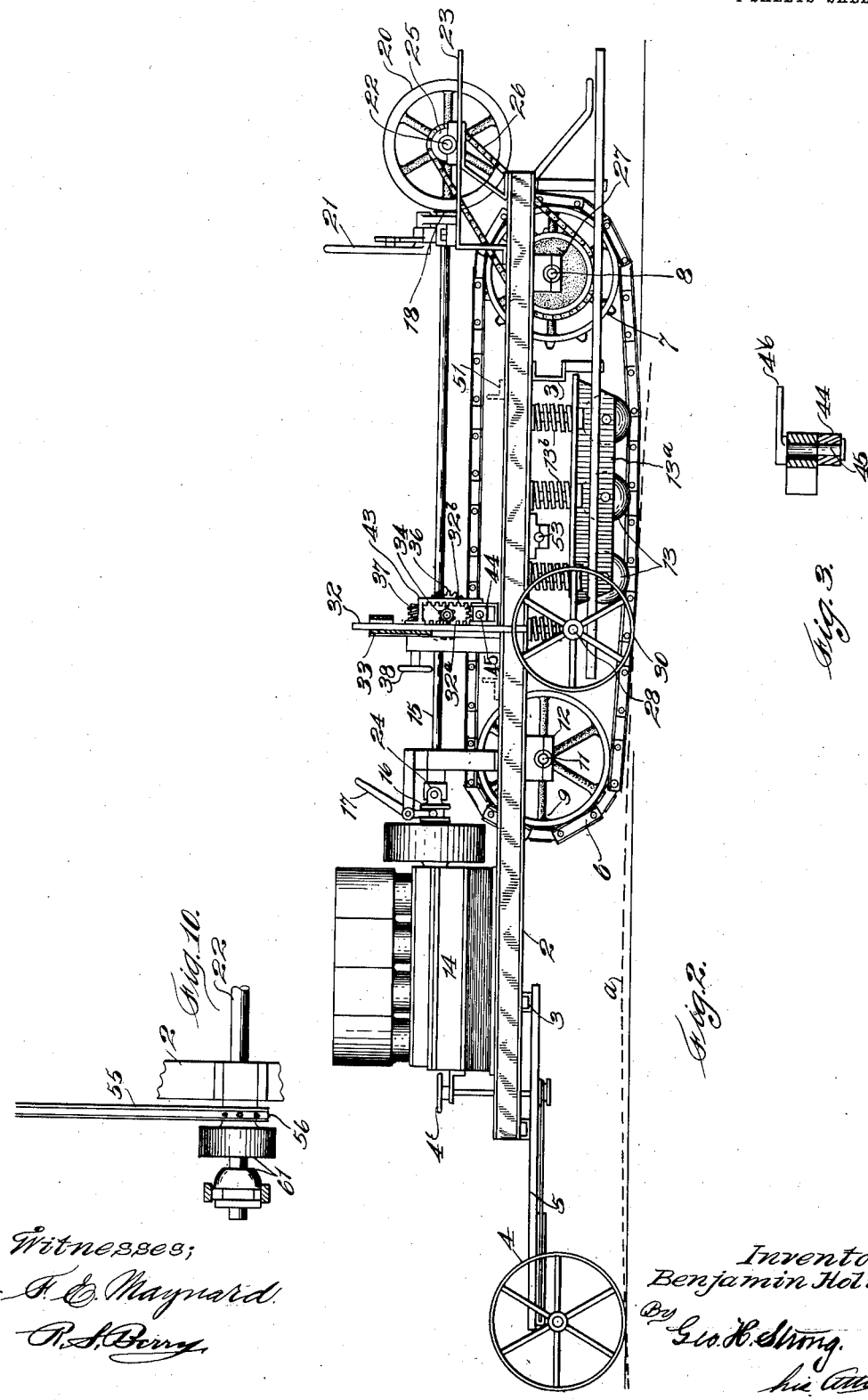

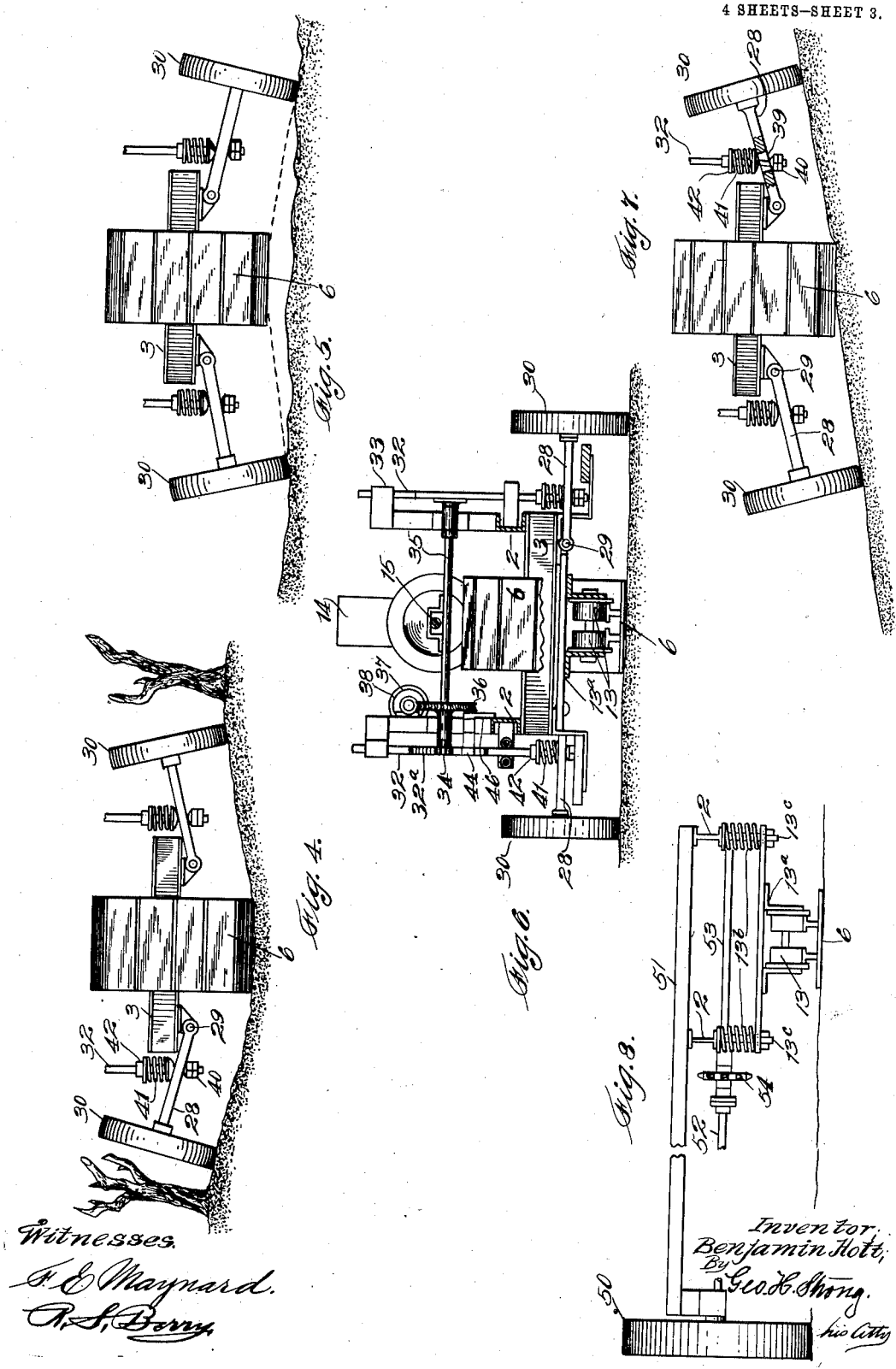

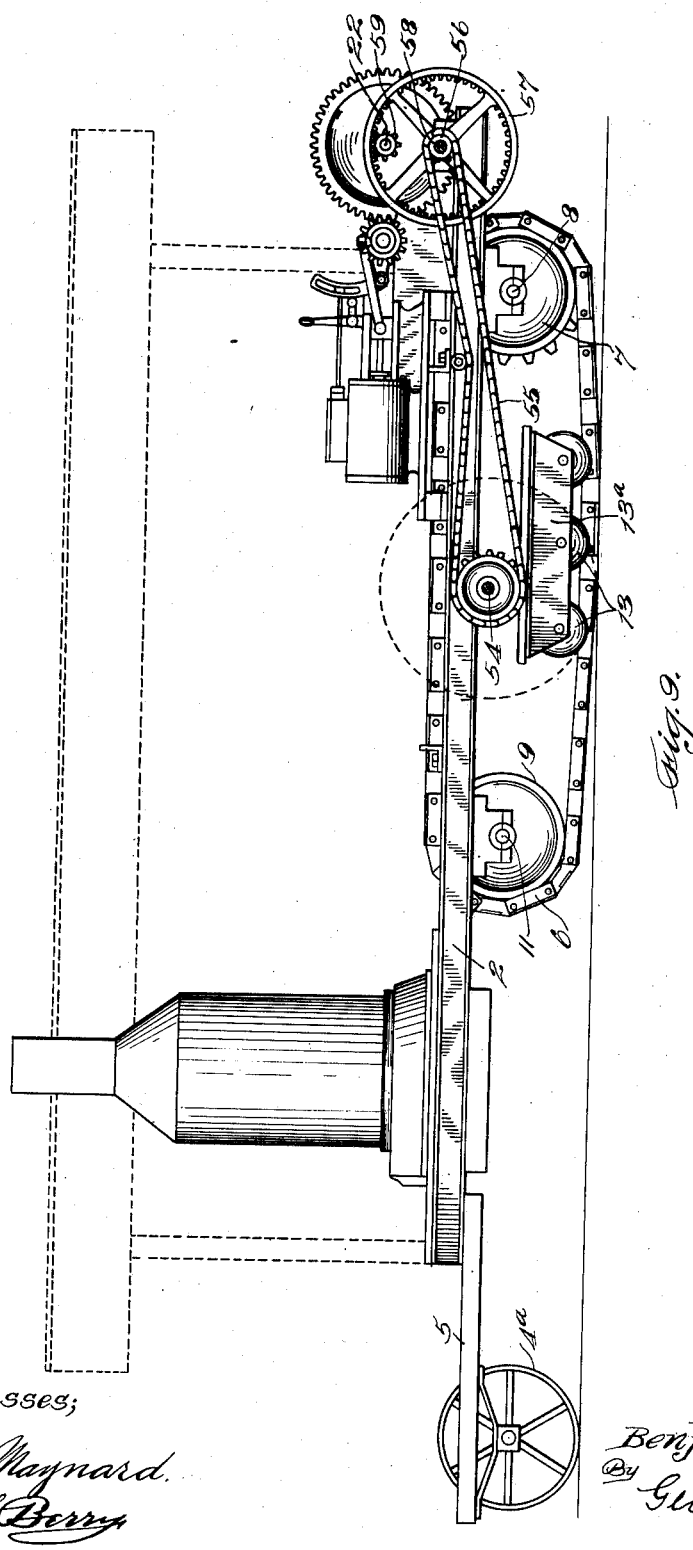

UNITED STATES PATENT OFFICE.

BENJAMIN HOLT, OF STOCKTON, CALIFORNIA.

TRACTION-ENGINE.

1,026,090.  Specification of Letters Patent.  Patented May 14, 1912.

Application filed August 17, 1909. Serial No. 513,309.

*To all whom it may concern:*

Be it known that I, BENJAMIN HOLT, citizen of the United States, residing at Stockton, in the county of San Joaquin and State of California, have invented new and useful Improvements in Traction-Engines, of which the following is a specification.

This invention relates to traction engines of the endless, self-laying track variety.

The present application has reference particularly to that feature of the invention which embodies a spring-mounted truck for carrying the load on an endless, flexible, self-laying track.

The invention consists of the parts and the construction and combination of parts as hereinafter more fully described and claimed, having reference to the accompanying drawings, in which—

Figure 1 is a plan view of the improved engine. Fig. 2 is a side elevation of the same. Fig. 3 is a detailed section of the rack-shifting mechanism. Fig. 4 shows the machine adjusted to run in a hollow. Fig. 5 shows the machine adjusted so that the traction belt is above the level of the side runners. Fig. 6 is an end view of the machine. Fig. 7 shows the machine adjusted to run upon a hillside, with the main frame horizontal. Fig. 8 is a detail showing the roller truck in end view, and shows the side wheel attached. Fig. 9 is a side view showing the side runner driving gears and chain, and shows diagrammatically a steam boiler and engine for driving the traction wheel. Fig. 10 is a modified form of drive gears for side runner. Fig. 11 is a sectional view of the internal gear.

In some sections of the country very extensive areas are utilized for vineyards or orchards. The clear space between the parallel rows of vines or trees is frequently not more than six feet, and the harrowing and plowing of the soil is very slow and expensive when horse-power is used.

I have constructed and operated a special design of traction engine which is particularly applicable for use in narrow spaces and over uneven ground, and which may readily be adapted to general traction work.

The invention embodies a main frame comprising two longitudinal beams or sills 2, suitably spaced apart by the transverse ties or girders 3. Suitable steering wheels 4, which may be either of the turn-table or center king-bolt type, are connected with the tongue 5; these steering wheels supporting only a small portion of the weight of the vehicle. The steering is controlled from wheel 4'. The principal weight of the vehicle is carried upon a central, longitudinally extending, flexible, driven, endless tread-belt 6, to which power is imparted by a master sprocket 27 fast on shaft 8, which is journaled upon the beams 2 of the frame. The belt 6 is mounted so that it travels centrally between the beams 2, passing over a driving pulley 7 on shaft 8, and around a forward loosely running guide pulley 9 on shaft 11, which latter is mounted in suitable journals 12 secured to the main frame beams 2. The tread portion proper or ground run of the track belt 6 between the two pulleys 7—9 supports the principal weight of the machine on the rollers 13 journaled upon a truck $13^a$ which is yieldably connected to the beams 2 by means of spring $13^b$. Power to propel the traction belt 6 is obtained from a suitable motor or source of power 14 supported centrally with and upon the forward end of the main sills 2. A drive shaft 15 may be coupled with the motor 14 by the clutch 16, operated by lever 17, the rear end of shaft 15 having mounted upon it a bevel pinion 18 which is shiftable by lever 21 into engagement with either of gears 19 or 20 secured upon counter-shaft 22 journaled on a bracket 23 of the sill, for the purpose of driving the machine backward or forward. In order to allow the shaft 15 to have a slight oscillating motion, I have provided a universal or other suitable joint 24. The shaft 22 carries a pinion sprocket 25, and by means of a chain 26 running to a sprocket 27 on shaft 8, the belt 6 is driven, its direction of travel being determined by the gears 19 or 20 and the pinion 18. By this design and arrangement of parts I have produced a machine of minimum width since the traction member or supporting belt is placed centrally of the frame, and may be made as long as is desirable, and since it is approximately under the center of gravity of the load, great stability and tractive efficiency is obtained for so narrow a machine.

To accommodate the engine to various inequalities, or formations of the surface of the soil, and to maintain it upright under all conditions, I have provided adjustable side axles 28 located about centrally of the length of the frame and pivoted at 29 to the cross-beam 3. The outer ends of the axles are adapted to carry safety bearing-wheels 30, the axles 28 being adjustable so that the wheels 30 may be elevated or depressed to engage the soil, as clearly shown in Figs. 4, 5, 6 and 7. The axles 28 can be adjusted so as to lift and maintain the belt 6 entirely clear of the ground, when expedient; such, for instance, being desirable when the operator wishes to economize fuel by taking advantage of gravity to coast down grade, during which adjustment the vehicle would be supported by the steering wheels and the bearing wheels 30.

Any desirable means may be employed for adjusting the axles 28, such being shown in this instance as comprising a rack bar 32 slidable in bearing 33, by means of a pinion 34, these pinions being secured upon a transverse shaft 35, turnable by means of a worm-wheel 36, worm 37, and handle 38. The lower end of each bar 32 passes through a slot 39 in the axle 28, and has a lock-nut 40 at its lower end. A strong spring 41 surrounds each bar 32 which carries a collar 42 between which and an axle 28 the spring reacts, thus forming a resilient bearing for the pivoted axles on each side of the engine.

In order to permit of the individual and opposite adjustment, if desired, of the axles, one of the rack bars 32 is provided with a yoke or bracket 43, in which is slidable a rack block 44, mounted upon a crank 45, which is provided with a handle 46, whereby the crank may be turned so that the rack bar 32 may be shifted to enable either rack 32$^a$ or 32$^b$ to be intermeshed with pinion 34. Thus when rack 32$^b$ is in engagement with pinion 34, the axles 28 will be movable in opposite directions, whereas when the racks 32$^a$, one on each bar 32, are in mesh with the pinions 34, they will work in the same direction, i. e., upwardly or downwardly together. By this mechanism, the axles 28 may be readily adjusted to suit all normal requirements existing in vineyards and orchards, and the engine is susceptible to such other adjustments as are highly conducive to the best results.

The engine embodied in this invention, and actually constructed, is less than five feet in width, is simple, of few parts, and is particularly useful under the conditions stated. A driven side wheel 50 is journaled upon an A-shaped frame 51 which is removably attached to the main beams 2, Fig. 1, so that the wheel 50 has a position well out from the side and about centrally of the length of the frame 2. The frame 51 may be bolted upon either side of the machine so as to best accomplish its purpose; for instance, when hauling a harvester, the frame will be secured to extend from the right-hand side of the machine, and when hauling a plow, it is adjusted to extend from the left-hand side. Though it is not necessary to do so, the safety wheels 30 and their axles 28 may be disconnected at the pivots 29 when the side wheel 50 is attached to the machine. The side wheel 50 performs dual functions: First, it assists in driving, and second, it may be used as a pivot about which to turn the machine. It is preferable to make the extension frame entirely detachable, for the reason that when it is intended to use the engine in an orchard or vineyard, a minimum width is desirable, and then the safety wheels 30 will maintain the engine in equilibrium. The side wheel 50 is secured to a shaft 52 mounted in the frame 51, and the shaft 52 is adapted to be coupled to a transverse shaft 53 journaled in the main frame 2 and carrying a sprocket 54 driven by a chain 55 running over a pinion 56 secured to an internal spur gear 57 mounted on an adjustable stud 58 so as to be engaged and disengaged with a pinion 59 fastened upon shaft 22. The short transverse shaft 53 projects slightly from each side of the frame 2 so that the shaft 52 carrying the side wheel 50 may readily be coupled when the frame 51 is attached.

By means of the adjustable gear 57 power may be transmitted intermittently to the shaft 53, thus economizing power when the side wheel 50 is not attached; and I have provided, surrounding the internal gear 57, a simple band brake 60, by means of which, when the gear 57 has been disengaged from pinion 59, the gear 57 and the wheel 50 may be held rigidly against rotation, and consequently if the main traction wheel 6 is driven, the machine will turn about the now fixed wheel 50 as a pivot. This is a very important advantage in a machine of this type.

It is understood that any preferred form of steering wheel may be employed, and I have found that the well-known turn-table wheel 4$^a$ presents the advantage, when the engine is being operated over hard, lumpy ground, of forming a preliminary breaker or crusher, producing a somewhat smoothed bed for the following platform wheel 6. Again, I have found that a pair of well separated wheels 4 are of value in soft yielding ground, as they offer a broad two-point support for the forward end of the machine, giving it more stability, a much desired quality.

In addition to the yielding, balancing support furnished by the safety wheels 30, the truck 13$^a$ is adapted to have a relatively free yielding action by means of the springs 13$^b$, the longitudinal movement of the truck being limited by the pins 13$^c$ which are rigidly fastened to the sill 2 and project through suitable openings in the truck.

The necessity of a yielding truck 13$^a$ is apparent when the engine is being propelled over rolling ground, as indicated by the dotted line *a*, Fig. 2. Under this condition the steering wheel or wheels will be on the descending side of an incline, while the driving tractor will be ascending, and if the truck was rigidly connected to the frame 2 almost the entire weight would be imposed upon the first roller 13 and upon the individual shoe of the tractor at the instant under the roller. Manifestly then, by the provision of the yieldable truck 13ª the load is distributed evenly to the rollers, and the life of the parts much increased, and chance of breakage or injury reduced.

In Fig. 9 is shown the mechanism for driving the countershaft 53. It also shows the engine equipped with a steam set, which is preferred in some countries where coal is plentiful and cheap and gasoline is not extensively used.

Fig. 10 shows a slightly modified drive for the side wheel 50, in which the pinion 56 is loosely mounted on the counter shaft 22 and may be coupled thereto by the clutch 61.

The engine I have provided embodies peculiar construction and design, which make it exceptionally useful in the transportation of freight or as a vehicle of commerce in the far northern regions where snow and ice abound so much of the year and the roads are obliterated.

In the machine illustrated a single endless flexible traction member is shown as the machine is designed primarily for work in narrow spaces but it is obvious that for ordinary traction work the machine would be equipped with duplicate traction members each with its individual truck.

The truck frame is a rigid frame and is guided to move in a vertical plane parallel with the line of travel of the machine. The springs or resilient supports are interposed between the truck and main frames to normally hold the bottom or bearing portions of the truck below the level of the sprocket wheels whereby the truck carries the load of the engine while the sprocket wheels are supported in their bearings and carry no part of the vehicle load.

With the construction described it will be seen that the truck is so held that it is permitted to yield upwardly bodily or at either end, but the longitudinal and lateral movements of the truck are limited so as to retain the truck in proper relation to the ground run of the track belt.

Having thus described my invention, what I claim and desire to secure by Letters-Patent is—

1. In a vehicle, the combination with a frame and steering wheel, of a driver embodying front and rear sprockets supported in bearings and themselves supporting no part of the weight of the vehicle, an endless flexible track belt passing around and guided by the sprockets, a truck traveling on the ground run of the belt and having an extended operative face normally in a plane below the level of the sprockets whereby the truck carries the weight of the vehicle, and resilient means interposed between the truck and frame to permit the truck to yield upwardly bodily or at either end.

2. In a vehicle, the combination with a frame and steering wheel, of a driver embodying front and rear sprockets supported in bearings and themselves supporting no part of the weight of the vehicle, an endless flexible traction member passing around and guided by the sprockets, a rigid truck extending longitudinally between the sprocket on the ground run of the traction member, and having its traction member engaging face normally in a plane below a plane tangent to the bottom of the sprockets, whereby the truck carries the weight of the vehicle, resilient means interposed between the truck and frame to permit the truck to yield upwardly bodily or at either end, and means for limiting the longitudinal and lateral movements of the truck.

3. In a vehicle, the combination with a frame, of front and rear sprockets in line on the frame and themselves supporting no part of the load, an endless flexible track belt passing around the sprockets, a truck traveling on the ground run of the belt, springs interposed between the truck and frame to permit the truck to have a rocking and bodily yielding upward movement independent of the sprockets, rollers interposed between the under side of the truck and the ground run of the belt, said truck supporting the load and preventing the portion of the ground run of the belt on which the truck runs from buckling upward.

4. The combination with a vehicle frame and front and rear wheels in line and journaled on the frame, of supporting means therefor; said supporting means including an endless belt passing over said wheels with the lower run in contact with the ground, and a vertically movable rigid truck inside the belt and between the wheels and having spring connections with the frame to permit of a yielding oscillating movement of the truck independent of said wheels and frame, and against the under side of which truck the back of the ground run of the belt operates, said truck being so positioned with respect to said wheels that the truck projects below the level of the bottom of the wheels and supports the load.

5. The combination with a vehicle frame, and front and rear wheels in line and journaled on the frame, of supporting means therefor; said supporting means including an endless belt passing over said wheels with the lower run in contact with the ground, and a yieldingly supported upwardly movable rigid truck inside the belt and between the wheels and having a yielding oscillating movement independent of said wheels, and against the under side of which truck the back of the ground run of the belt operates; means for preventing the fore and aft movements of said yieldingly supported truck and means to impart motion to the rearmost of said wheels to drive the belt in either direction, said truck and not the wheels supporting the load.

6. In a traction engine, the combination of a frame, a vertically movable spring pressed truck yieldingly supporting the frame, front and rear wheels in the plane of the truck, and supported above the level of the bottom of the truck, the rearmost one of said wheels being journaled on the frame independently of the truck, an endless, flexible traction member passing around said wheels and underneath the truck, with the ground run of the traction member supporting the truck, and means for applying power to said rear wheel to operate the traction member, the construction being such as to permit the truck to yield upwardly bodily or at either end.

7. In a self-propelled vehicle, the combination of a main frame having a front steering wheel and a single rear tractor, approximately centrally disposed beneath the frame and of relatively narrow width compared with the width of the frame, said tractor comprising an endless, flexible, articulated traction member; front and rear sprockets in line on the frame around which the member travels, a rigid truck inside the belt having rollers bearing on the ground run of the traction member, said truck connected to cross pieces which extend to each side of the frame, and individual springs between the ends of the cross pieces and the frame yieldingly supporting the frame, and side bearing wheels connected with the frame to maintain the machine in upright position.

8. The combination in a traction engine, of an engine frame, a truck comprising a rigid beam-like construction having its greatest dimension in the direction of its length, and extending parallel with the engine frame, an endless, flexible, articulated traction belt surrounding and in the plane of the truck, front and rear sprockets on the frame, which sprockets are independent of the truck, and around which the belt passes, rollers on the truck bearing on the ground run of the belt, the portion of the belt which is in contact with the rollers being below the lowest points of said sprockets, whereby the load is carried by the truck and rollers and not by the sprockets, a plurality of springs interposed between the truck and frame, along the length of the truck to yieldingly support the frame on the truck to permit it to yield upwardly bodily or at either end, and means to limit the fore and aft movements of the truck.

In testimony whereof I have hereunto set my hand in the presence of two subscribing witnesses.

BENJAMIN HOLT.

Witnesses:
G. A. DICKENSON,
F. H. CHISHOLM.